(12) United States Patent
Fournier

(10) Patent No.: US 9,121,256 B2
(45) Date of Patent: Sep. 1, 2015

(54) METHOD OF CONSTRUCTING A FLOW MODEL ASSOCIATED WITH CAPILLARY PRESSURE CURVES AND/OR RELATIVE PERMEABILITY CURVES

(75) Inventor: Frédérique Fournier, Cormeilles en Parisis (FR)

(73) Assignee: IFP Energies nouvelles, Rueil-Malmaison Cedex (FR)

(*) Notice: Subject to any disclaimer, the term of this patent is extended or adjusted under 35 U.S.C. 154(b) by 419 days.

(21) Appl. No.: 13/309,630

(22) Filed: Dec. 2, 2011

(65) Prior Publication Data

US 2012/0143578 A1    Jun. 7, 2012

(30) Foreign Application Priority Data

Dec. 3, 2010   (FR) ..................................... 10 04710

(51) Int. Cl.
    *G06G 7/48*      (2006.01)
    *E21B 49/00*      (2006.01)
    *G01V 1/28*      (2006.01)
    *G01V 11/00*      (2006.01)

(52) U.S. Cl.
CPC . *E21B 49/00* (2013.01); *G01V 1/28* (2013.01); *G01V 11/00* (2013.01); *G01V 2210/66* (2013.01)

(58) Field of Classification Search
CPC .......... G01V 2210/40; G01V 2210/48; G01V 2210/60; G01V 2210/61; G01V 2210/614; G01V 2210/62; G01V 2210/624; G01V 2210/6246; G01V 2210/6248; G01V 2210/66; G01V 2210/663; G01V 2210/665; G01V 1/28; G01V 11/00; G06N 7/00; G06F 17/50; G06F 17/5009; G06F 19/00; G06F 2217/00; G06F 2217/16; E21B 49/00
USPC ........................................................... 703/10
See application file for complete search history.

(56) References Cited

U.S. PATENT DOCUMENTS 5,835,883 A * 11/1998 Neff et al. .......................... 702/7
6,230,101 B1    5/2001 Wallis

OTHER PUBLICATIONS

Pattern-Based Approach to Multiphase Flow Upscaling Using Distance-Based Modeling, Ip.com No. IPCOM000200463D, Oct. 14, 2010, disclosed anonymously.*

(Continued)

*Primary Examiner* — Aniss Chad
(74) *Attorney, Agent, or Firm* — Fitch, Even, Tabin & Flannery LLP

(57) ABSTRACT

A method of constructing a reservoir flow model from capillary pressure curves (Pc) and/or relative permeability curves (Kr) is disclosed having application to petroleum reservoir development, acid gas storage and underground water management. After discretizing the reservoir into a set of cells, a principal component analysis is performed for a data table constructed from curves (Pc, Kr) so as to extract principal factors explaining the data. The curves are represented in a representation space constructed from these principal factors and the curves represented in the representation space are classified. At least one curve representative of each class resulting from this classification is then defined and associated with each cell.

29 Claims, 6 Drawing Sheets

(56) References Cited

OTHER PUBLICATIONS

Dupouy et al., Grouping Pseudo Relative Permeability Curves, In Situ, 22(1), 1-33 (1998).*

Lee, Sang Heon, et al: "Electrofacies Characterization and Permeability Predictions in Carbonate Reservoirs: role of Multivariate Analysis and Nonparametric Regression", Proceedings—SPE Annual Technical Conference and Exhibition 1999, Oct. 3-6, 1999, pp. 1-13, XP002658543, Soc. Pet. Eng. (SPE).

* cited by examiner

METHOD OF CONSTRUCTING A FLOW MODEL ASSOCIATED WITH CAPILLARY PRESSURE CURVES AND/OR RELATIVE PERMEABILITY CURVES

BACKGROUND OF THE INVENTION

1. Field of the Invention

The present invention relates to the development of underground reservoirs such as petroleum reservoirs, gas storage sites or underground waters. In particular, the invention allows construction of reservoir models used for simulating fluid flows (hydrocarbons, water, CO2, etc.) in underground reservoirs and to eventually allow production or injection prediction, and optimization of the management of such underground reservoirs.

2. Description of the Prior Art

Optimization and development of petroleum reservoirs, for example, are based on the most accurate possible description of the structure, the petrophysical properties, the fluid properties, etc., of the reservoir. A tool known as a "flow model" allows accounting for these aspects in an approximate way. Such a model is a model of the subsoil, representative of both its structure and its behavior. Generally, this type of model is represented in a computer and is then referred to as a "numerical model." A flow model comprises a grid, generally three-dimensional, associated with one or more petrophysical properties (porosity, permeability, saturation, lithology, etc.). The association assigns values of the petrophysical properties to each cell of the grid.

These models, which are well known and widely used in the petroleum industry, allow determination of many technical parameters relative to the study or the development of a reservoir, such as a hydrocarbon reservoir. In fact, since the flow model is representative of the structure of the reservoir and of the behavior thereof, engineers use it, for example, to determine which zones are the most likely to contain hydrocarbons, the zones in which it can be interesting/necessary to drill an injection or a production well in order to enhance hydrocarbon recovery, and the type of tools to use, the properties of the fluids used and recovered, etc. The interpretations of flow models in terms of "technical development parameters" are well known. Similarly, modelling $CO_2$ storage sites allows monitoring of these sites, to detect abnormal behaviors and to predict the displacement of the injected $CO_2$.

In general terms, the flow model is constructed on the basis of a fine geological description of the sedimentary layers that make up the reservoir. This geological description provides data to each cell in terms of lithologies. Lithologies are the various types of rocks present within the reservoir, such as sandstones, argillaceous sandstones and dolomites. There can be lithologic and sedimentary facies.

Once the model is described in terms of lithologies, the petrophysical properties required for flow simulations are then assigned according to these lithologies. A specific lithology will specifically have a particular porosity and permeability distribution, as well as saturations, relative permeabilities, capillary pressures, etc. These petrophysical properties generally result from laboratory analyses on rock samples taken from the reservoir (cuttings, cores).

Another type of petrophysical property necessary for flow simulations relates to the capillary pressure curves and the relative permeability curves. In this case also, assigning these physical properties to the cells of the flow model is done in close connection with the lithologic and sedimentary facies encountered on the corresponding cells. This assigning is also achieved from experimental measurements performed in the laboratory on rock samples taken from the reservoir. The experimental measurements lead in particular to a set of data relative to the capillary pressure and relative permeability curves.

In order to associate such curves with specific lithologies, it is common practice to sort them out manually, by observing them visually, so as to study the possibility of defining typical curves. That is, model curves representing, for example, the typical behavior of a given lithology. When this analysis is complete, when it is possible to classify the experimental curves measured in the laboratory and to define typical curves for the various lithologies present in the reservoir, the lithologies are said to be associated with rock types characterized by a very specific petrophysical behavior, in particular in terms of saturation, capillary pressure and relative permeability.

However, this visual comparison allowing the capillary pressure and/or relative permeability curves to be classified rapidly becomes difficult to achieve when there are a large quantity of experimental measurements. If several dozen experimental curves are available, or even several hundred, manual classification is difficult to implement and leads to very subjective results (related to the person leading the analysis) that are not really based on quantitative criteria.

SUMMARY OF THE INVENTION

The present invention relates to a method for constructing a representation of an underground reservoir wherein the reservoir is discretized into a set of cells, and capillary pressure curves and/or relative permeability curves are automatically assigned to each cell. The method is based on an automatic curve processing allowing establishing families of curves through analysis of their morphology.

The invention is a method for constructing a representation of an underground reservoir from curves describing an evolution of a saturation of a fluid as a function of at least one property P relative to the flow of the fluid within the reservoir, wherein the reservoir is discretized into a set of cells.

The method comprises the following stages:
carrying out a principal component analysis of a data table constructed from the curves, to extract principal factors explaining the data;
representing the curves in a representation space constructed from the principal factors;
carrying out a classification of the curves represented in the representation space;
defining at least one curve representative of each class resulting from the classification; and
associating with each cell one of the representative curves.

According to the invention, the data table can be constructed by carrying out: re-sampling the curves with a regular interval common to the various curves; and constructing the table where each row corresponds to a value of the property P obtained after re-sampling, and where each column corresponds to a corresponding value of the saturation observed on the re-sampled curves.

Preferably, the principal component analysis is carried out using the columns as variables and the rows as observations.

The property relative to the fluid flow can be the capillary pressure, the relative permeability, or a Leverett transform of the capillary pressure or of the relative permeability.

According to the invention, the following stages can be carried out to construct the representation space:
I determining a number of principal factors to be kept for characterizing a morphology of the curves;
ii determining a parameter characterizing the curves in relation to the principal factors being kept; and iii defining axes of the representation space by the values of the parameter.

The parameters can represent a correlation between the curves and the principal factors kept, or a contribution of the curves to the factors which are kept.

According to the invention, classification can be performed by an algorithm selected from among the following methods: K-means method, unsupervised neural network method, unsupervised Kohonen network method, hierarchical classification method, supervised discriminant analysis method and supervised neural network method.

The curves representative of a class can be defined by a mean calculated on at least two curves that are the closest to a center of gravity of the class; or by a median of the curves of the class or on a selection of the curves of the class, or with respect to a center of gravity of the class. According to an embodiment, the curves representative of a class are defined after filtering on the principal factors used in the classification.

Finally, according to the invention, an optimum development scheme can be defined for the reservoir from the reservoir representation and by a flow simulator, and the reservoir can then be developed according to this optimum development scheme.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTION OF THE INVENTION

The method of the present invention is described with respect to an embodiment where the curves to be analyzed are capillary pressure curves. The method is also applicable for processing relative permeability curves, or for simultaneously processing relative permeability and capillary pressure curves.

A capillary pressure curve is a curve representing the capillary pressure as a function of saturation, and a relative permeability curve is a curve that represents the relative permeability as a function of saturation.

Figure 1:
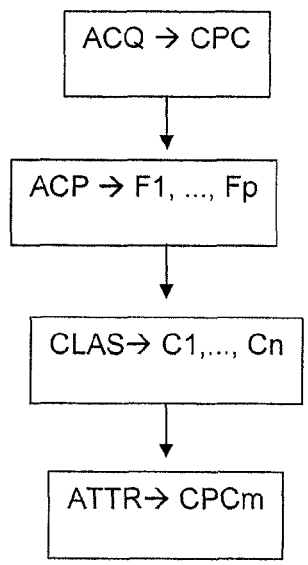
FIG. 1 illustrates the stages of the method according to the invention.

FIG. 1 illustrates the stages of the method according to the invention allowing construction of a representation of an underground reservoir from a discretization of the reservoir into a set of cells with each cell being associated with a lithology value:

1. Acquisition (ACQ) of capillary pressure curves (CPC),
2. Principal component analysis (ACP) of the capillary pressure curves,
3. Classification (CLAS) of the capillary pressure curves, and
4. Assigning (ATTR) a capillary pressure curve to each cell.

1—Acquisition of Capillary Pressure Curves

The acquisition of curves describing an evolution of a saturation of a fluid as a function of at least one property (capillary pressure, relative permeability) relative to the flow of this fluid in a reservoir are well known. The at least one property may also be a Leverett transform of capillary pressure or a Leverett transform of relative permeability.

These laboratory experiments are performed on samples extracted from the reservoir. Capillary pressure and relative permeability curves are determined for example. The capillary pressure and/or relative permeability curves can be processed regardless of the experimental method used to obtain them.

The specific embodiment example analyzes a set of 110 capillary pressure curves obtained in the laboratory by the mercury injection method, on rock samples from a petroleum reservoir corresponding to different lithologies. The curves correspond to measurement pairs (mercury saturation, mercury injection pressure). It is well known to convert these curves to water saturation/capillary pressure curves or oil saturation/capillary pressure curves in order to remove the effects of different fluids prior to analyzing the shapes of the curves.

Figure 2:
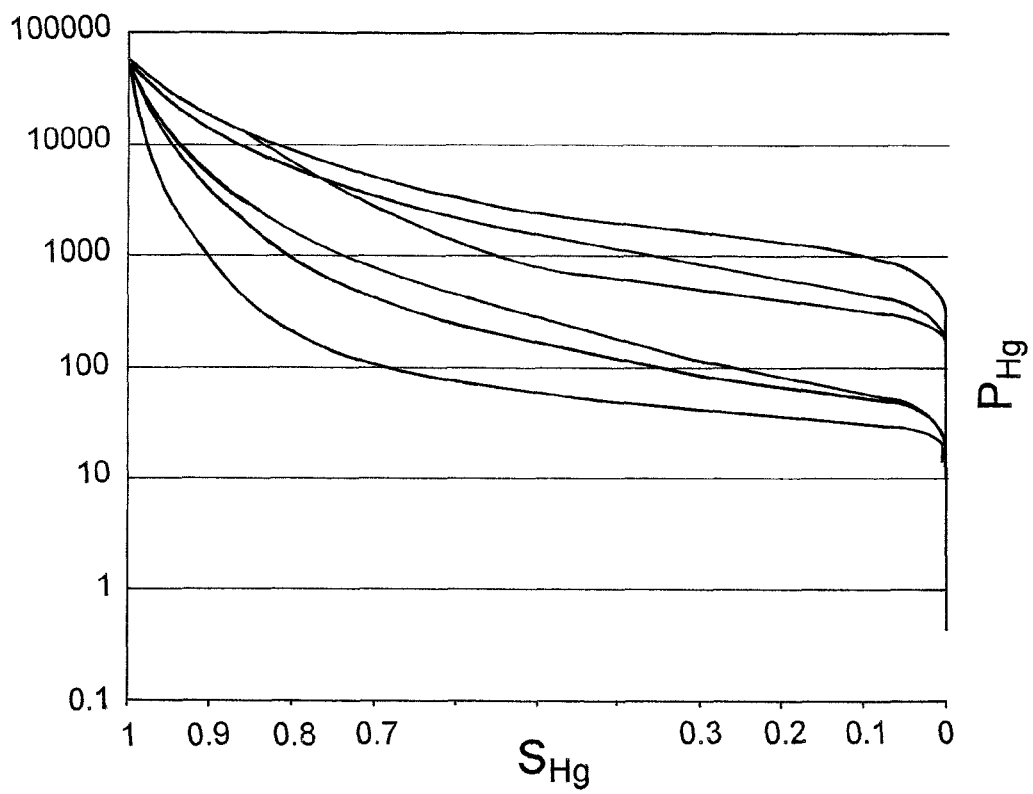
FIG. 2 shows examples of capillary pressure curves with the horizontal axis corresponding to the mercury saturation (SHg) injected into the pore volume of the sample being analyzed, and the vertical axis showing the corresponding mercury injection pressure (PHg)

FIG. 2 shows examples of capillary pressure curves. The horizontal axis corresponds to the mercury saturation (SHg) injected into the pore volume of the sample analysed and the vertical axis shows the corresponding mercury injection pressure (PHg). Six curves are shown in FIG. 2, which correspond to six different samples being analyzed. It can be seen that the shape of the capillary pressure curve varies from one sample to the next. This variation is related to the relative mobility capacity of the fluids (mercury vs. air) within the pores of the reservoir rock.

2—Principal Component Analysis of the Capillary Pressure Curves

This stage performs a principal component analysis on a data table obtained from capillary pressure curves.

The Principal Component Analysis (PCA) is a method of data analysis and more generally relates to the multivariate statistics. PCA converts variables related to one another (referred to as "correlated" in statistics) to new independent (in the linear sense) variables (therefore "not linearly correlated"). These new variables are referred to as factors (or axes). These new variables are linear combinations of the original variables. This technique allows the information to be reduced to a more limited number of variables than the initial number.

Figure 3:
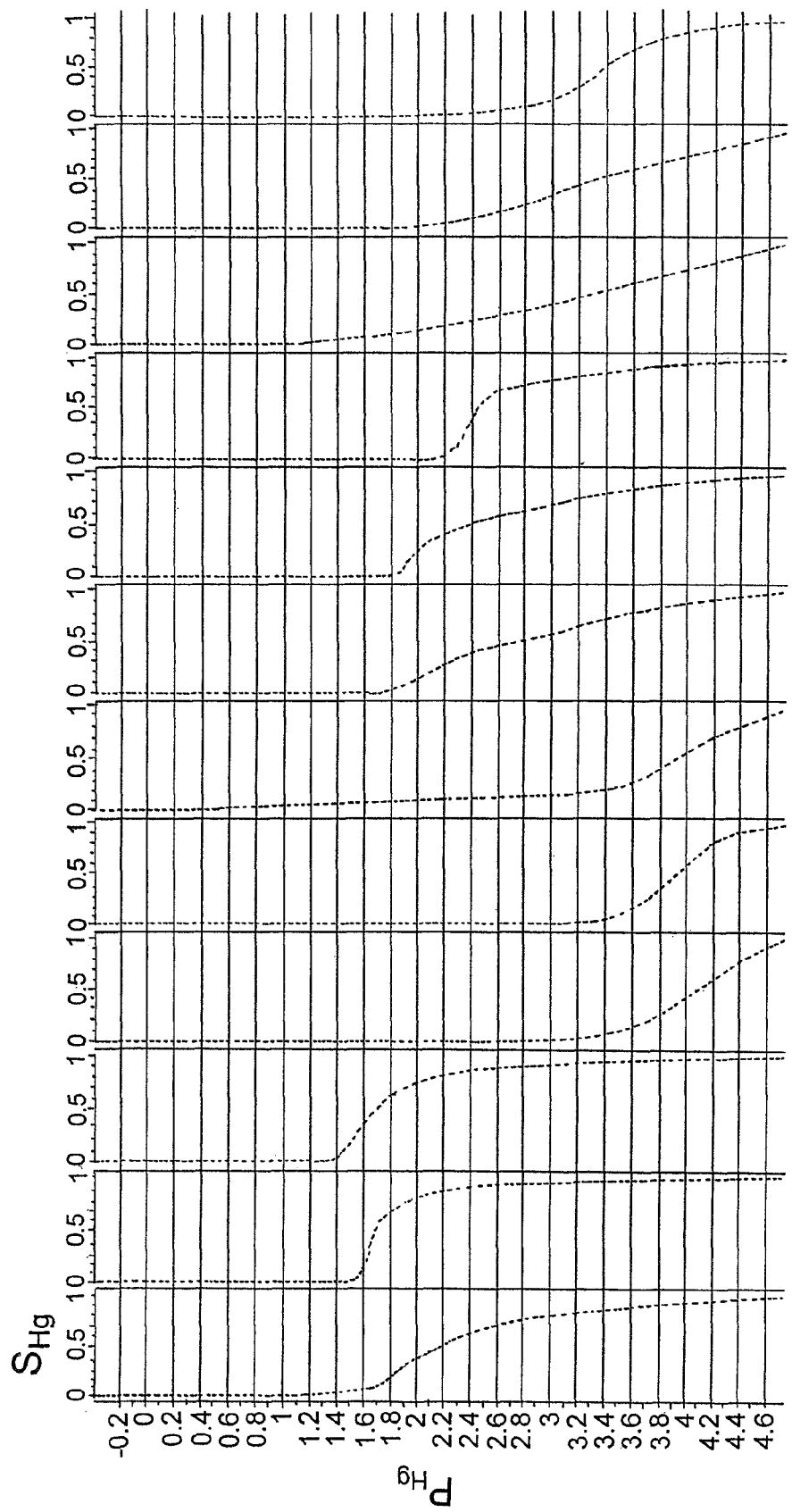
FIG. 3 shows capillary pressure curves belonging to the set of curves used in the specific example selected to illustrate the invention.

To apply this technique within the context of the invention, it is necessary to define the variables for which several observations are available. Therefore, according to the invention, the capillary pressure curves are re-sampled with a capillary pressure interval common to the various curves so that the saturation is provided in a regular grid common to all the curves being analyzed. Some re-sampled capillary pressure curves are shown in FIG. 3. A table where the rows are the regular values obtained after re-sampling the capillary pressure and the columns the corresponding saturation values observed on the various curves is then constructed. In the specific example, this table has 110 columns, since there are 110 capillary pressure curves to be analyzed, and 129 rows corresponding to the 129 capillary pressure values which are regularly sampled.

The rows are then defined as the observations (or statistical individuals). That is, the observations are the regular capillary pressure values (obtained after re-sampling). The columns are defined as the variables. That is, the variables are the corresponding saturation values observed on the various curves.

A principal component analysis is then applied to this table for the 110 variables for allowing extraction of principal factors (F . . . Fp). According to an embodiment, and according to the specific example, the table is normalized, that is, the eigenvalues and the eigenvectors extracted by the principal component analysis are extracted from the matrix of the correlations between the variables. Table 1 shows the first eigenvalues extracted from the principal component analysis applied to the set of curves associated with the illustrative example, and associated with the information contained in the factors that are calculated:

| Eigenvalue $\lambda_i$ | Information provided by factor i | Information cumulated by the first i factors |
|---|---|---|
| 89.90 | 0.8172 | 0.8172 |
| 15.55 | 0.1414 | 0.9586 |
| 2.64 | 0.0240 | 0.9827 |
| 1.10 | 0.0100 | 0.9927 |
| 0.37 | 0.0033 | 0.9960 |
| 0.18 | 0.0016 | 0.9976 |

It can be seen that the importance of the factors decreases with their rank, as is usual in principal component analysis. Thus, the first factor contains 81.72% of the information initially contained in the data table, the second only contains 14.14% and the third one 2.40%, and so on.

According to an embodiment, the capillary pressure values or the relative permeability values can be converted prior to being processed by principal component analysis. For example, the capillary pressure values can be replaced by the decimal logarithm of the capillary pressure or by the Leverett transform. The latter transform allows for example changing the shape of the curves to get away from the effect due to the pore size. The converted curves then become mainly related to the nature of the pore network. Such a conversion thus allows easier classification.

According to an embodiment, the principal component analysis performed on the data table constructed from the curves is carried out on the variance-covariance matrix (and not on the variable correlation matrix).

3—Classification of the Capillary Pressure Curves

This stage classifies the capillary pressure curves in various classes (C1 . . . Cn).

According to the invention, a representation space where they are classified is first constructed for the capillary pressure curves. This space is generated by the principal component analysis results. It comprises:
Determining a number of factors to be kept for characterizing the morphology of the capillary pressure curves being analyzed. These factors are referred to as dominant factors. Each factor explains a part of the variability—the variance—of the data. In the specific example, the first five factors of the principal component analysis have been kept which the five of them representing 99.60% of the total information contained in the data table; and
Determining a parameter characterizing the capillary pressure curves (initial variables) in relation to the various factors extracted from the principal component analysis which are retained to explain the data.

According to an embodiment, the correlations between the capillary pressure curves (initial variables) and the factors retained after the principal component analysis are determined.

According to another embodiment, the contributions of the capillary pressure curves (initial variables) to the various factors retained after the principal component analysis are determined.

iii. Generating the representation space by the parameter. This space is multidimensional and its axes correspond to the values of the parameter. Thus, according to an example, its axes correspond to the values of the correlations of the capillary pressure curves (initial variables) with the factors which are retained after the principal component analysis.

Figure 4A:
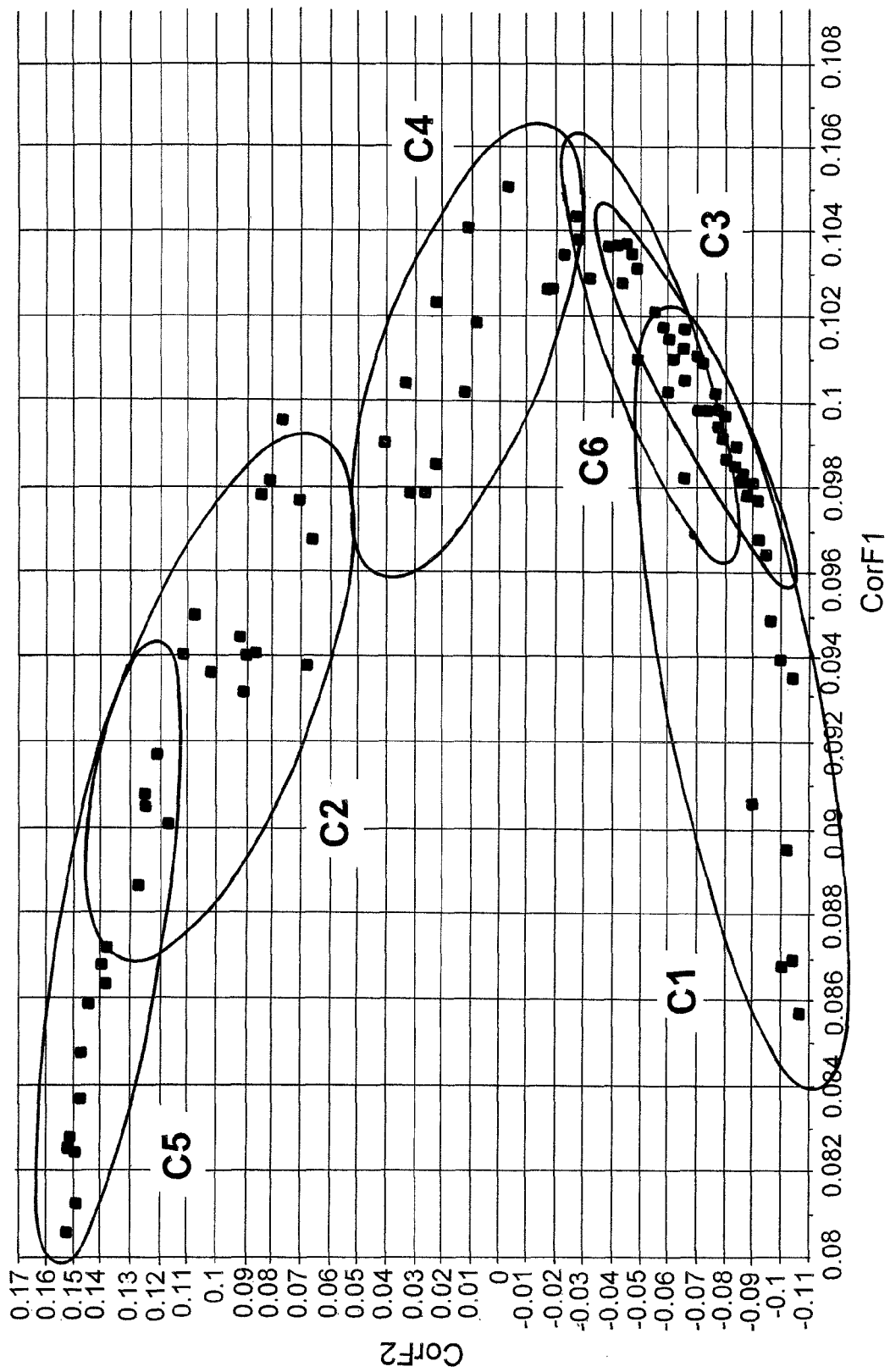
FIGS. 4a, 4b and 4c show the projection of the capillary pressure curves in a multivariate representation space.
Figure 4B:
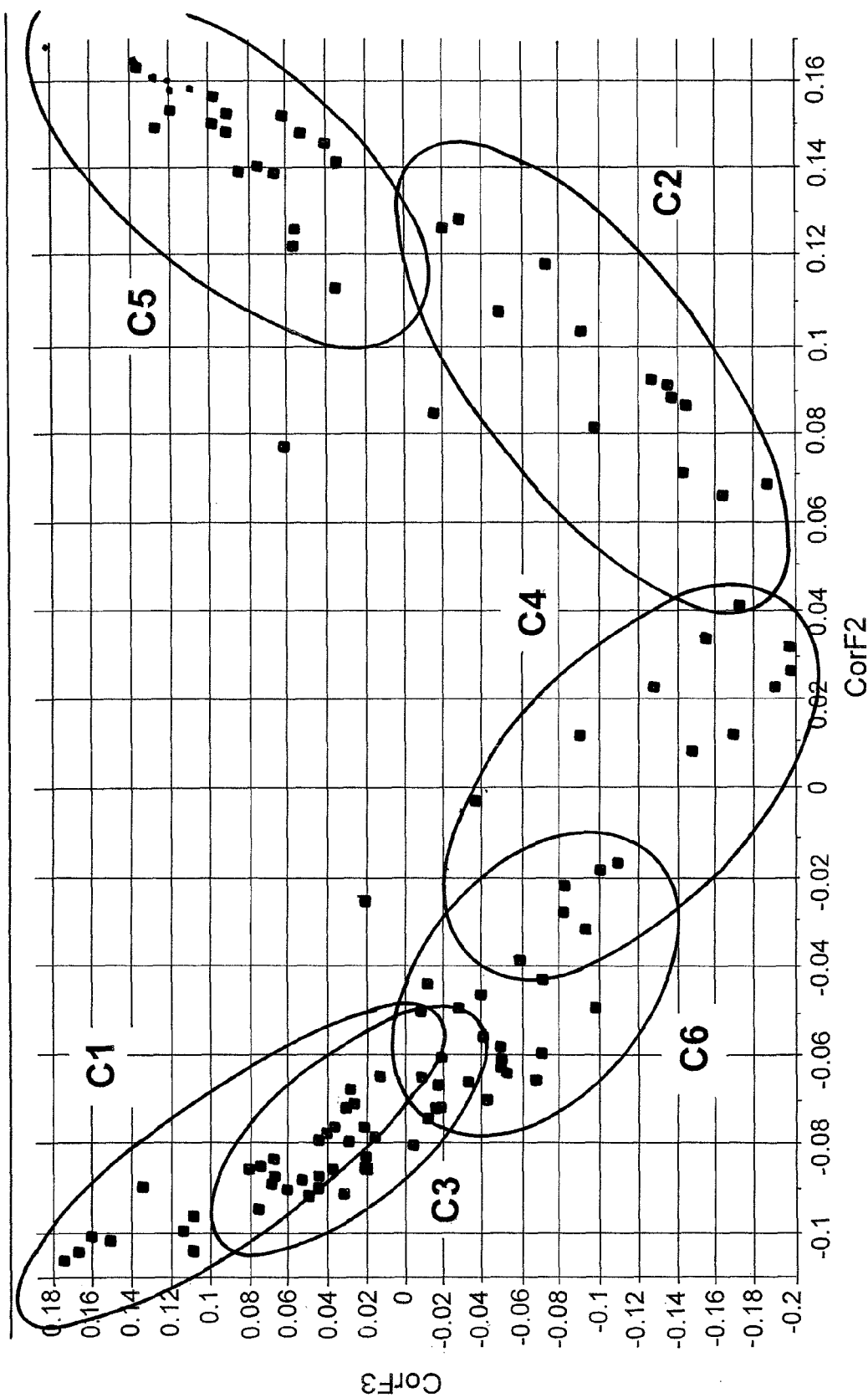
Figure 4C:
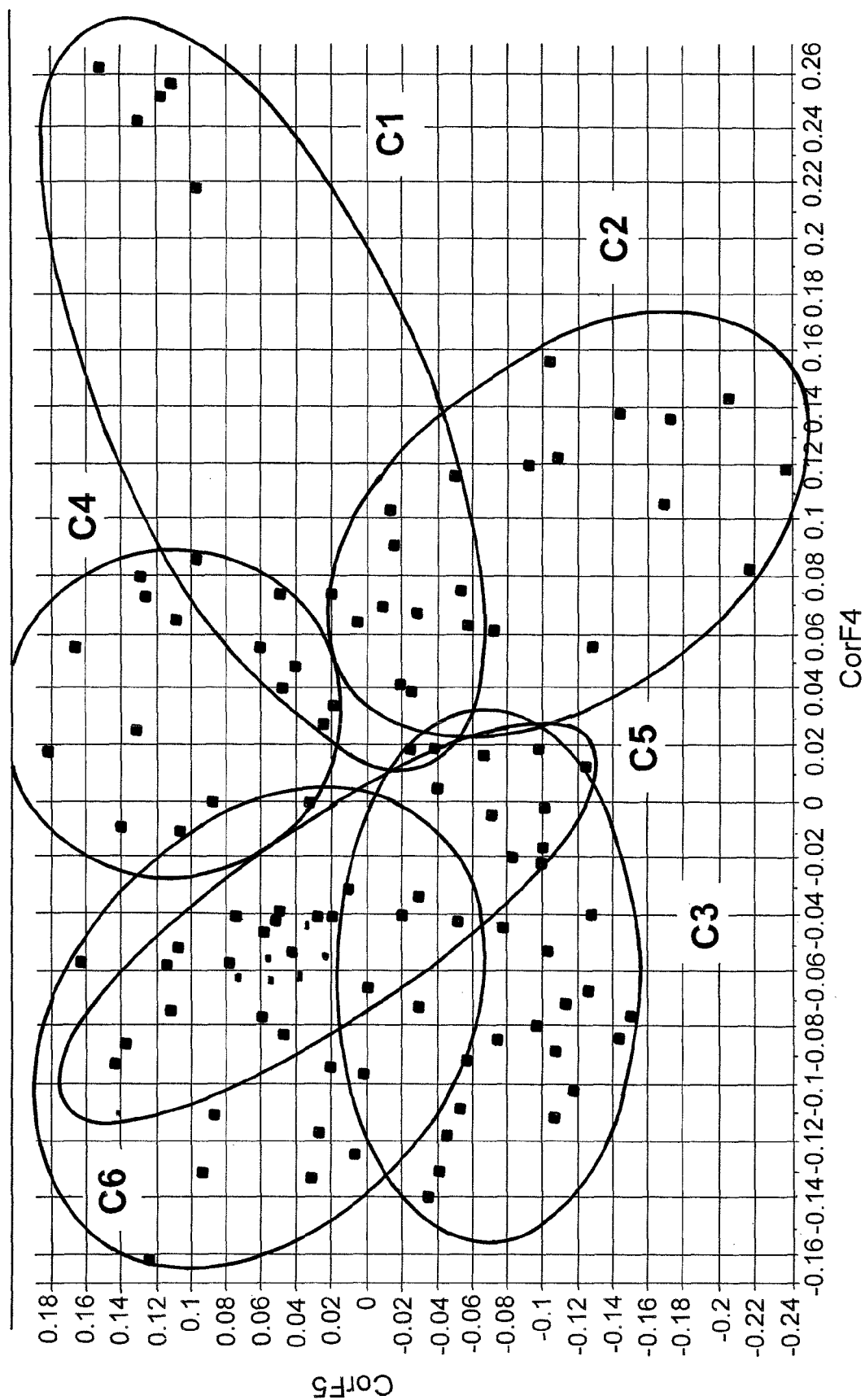

In the specific example, the first five factors of the principal component analysis have been kept (99.60% of the information). The curves representation space thus is a space of dimension 5 in which the 110 capillary pressure curves being studied are shown. Various planes of this space are shown in FIGS. 4a, 4b and 4c. These figures show the projection of the capillary pressure curves in a multivariate representation space whose axes are the values of the correlations (CorF1, CorF2, CorF3, CorF4, CorF5) of the curves with the factors (F1 . . . F5) of the principal component analysis. It is in this space that a classification algorithm is used for automatically defining families of capillary pressure curves.

The next stage is the classification of the capillary pressure curves shown in the representation space, i.e. the space associated with the correlations (parameter) between the curves and the factors selected after the principal component analysis.

There are many techniques for classifying objects in a multidimensional space. An automatic classification algorithm is preferably used. The method referred to as "K-means" can be used for example. This method is an unsupervised automatic classification method based on the analysis of the distances between the points representing the capillary pressure curves in the representation space.

In the specific example, six classes have been formed with this algorithm. Each class comprises points that are close in the 5-dimensional representation space, that is, capillary pressure curves of similar shape. In FIGS. 4a, 4b and 4c, the capillary pressure curves corresponding to the points are coded according to the six classes (C1 . . . C6) that have been determined in this stage.

Figure 5:
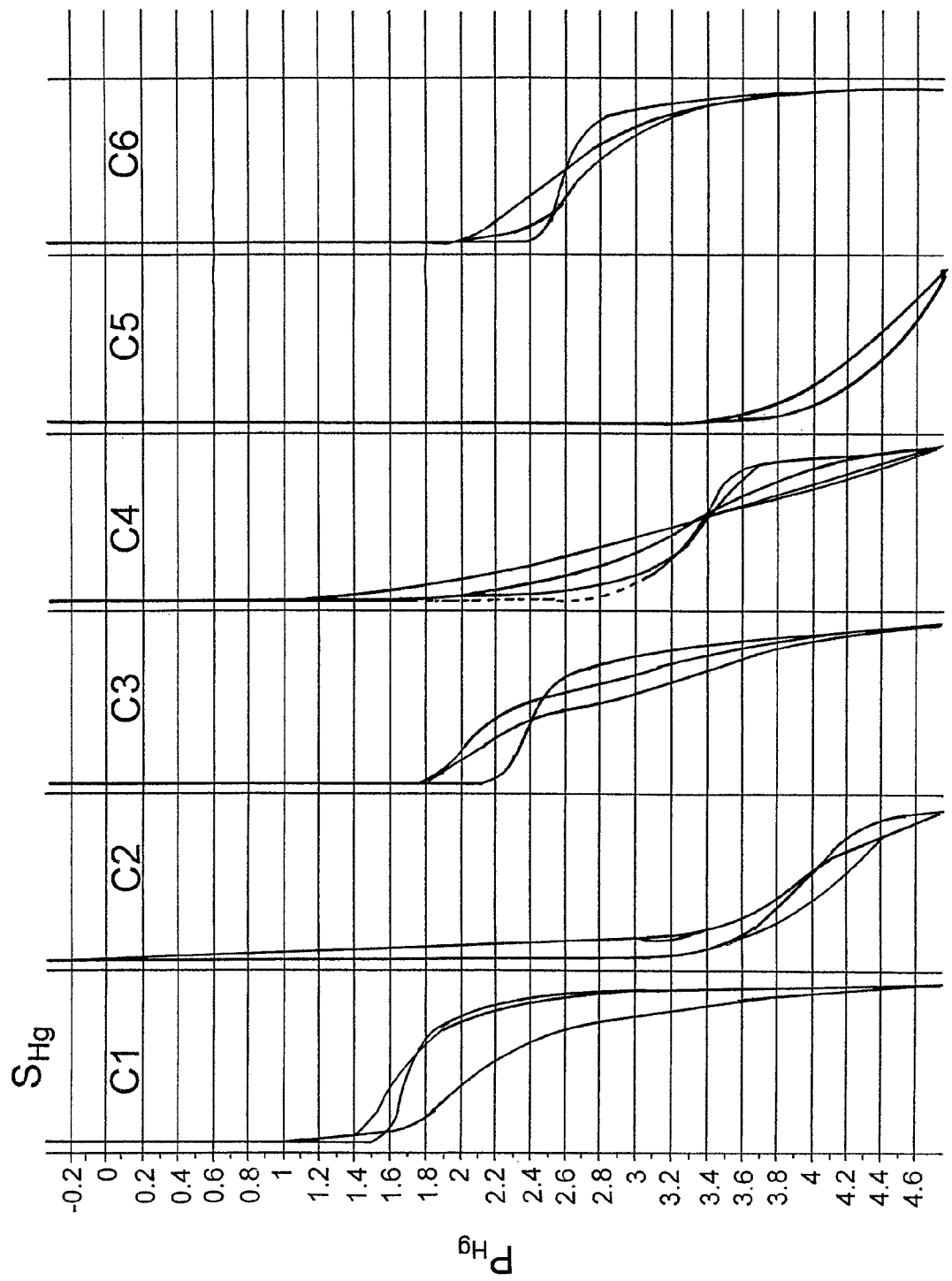
FIG. 5 shows some examples of capillary pressure curves for each of the six families defined from the classification which illustrate that the curves have similar shapes within one and the same family.

FIG. 5 shows some examples of capillary pressure curves for each of the six families defined from the classification, which illustrate that, in one and the same family, the curves have similar shapes.

According to another embodiment, the K-means method is replaced by an algorithm selected from among the unsupervised methods (neural network approach, Kohonen network, hierarchical classification method, etc.), or among the supervised methods (discriminant analysis, supervised neural network, etc.).

4—Assigning a Capillary Pressure Curve to Each Cell

In this last stage, one or more capillary pressure curves representative of each capillary pressure curve class are defined. These representative curves are referred to as "model curves" (CPCm).

According to an example, the model curves of each class are defined by the mean calculated on three "characteristic" curves shown in FIG. 5. These "characteristic" curves are the three curves that are the closest to the center of gravity of the class.

According to another example, the "model curves" of each class are defined by the median of the curves over the entire class or over a selection of the most typical curves of the family. It is also possible to use the mean or the median of the curves after filtering them on the principal factors used in the classification, or the center of gravity of the class.

Thus, a single representative capillary pressure curve referred to as "model curve" is associated with each capillary pressure class. This association allows defining six rock types according to their specific behavior in terms of capillary pressure.

Each class or each rock type is then associated with a particular lithology. A supervised classification method, such as the one used in the previous stage, can be used. Such a method allows a direct link to be established between the capillary pressure curve classes and the lithologies. It thus enables an immediate connection between lithologies and rock types. In this context, the learning information for the supervised classification algorithm is provided by the lithology of the rock samples on which the experimental measurements were performed (stage 1), and the curve classes are thus "preformed" by the lithologies. Each curve family detected by the classification algorithm is directly connected with a specific lithology of the reservoir studied.

The flow model is described in terms of lithologies and the "model curves", like the other petrophysical properties, are assigned according to these lithologies. A specific lithology thus has a specific capillary pressure curve (the "model curve"). The flow model is then described in each cell by a capillary pressure curve.

Advantages and Use

The present invention thus comprises automatic processing of the capillary pressure and/or relative permeability curves, which leads to the definition of various families of curves. Each family groups together curves whose shapes are very close to one another, thus allowing defining the typical curves using, for example, the mean curve calculated for one and the same family.

In the definition of the families, it is also possible to establish a connection with the lithologies, which then leads to the automatic construction of curves representative of each lithology present in the petroleum reservoir, defining really characteristic petrophysical behaviors.

The invention leads to a high efficiency gain insofar as there are many curves, and to a much more robust definition of the typical curves, since it is based on quantified characteristics of their morphology, and on a sorting method that is also quantified.

This method replaces a manual approach solely based on visual criteria, which is furthermore difficult to implement when the number of experimental curves available is significant.

From the flow model thus provided with information in terms of capillary pressure and/or relative permeability curves, efficient history matching and defining a development scheme for the reservoir (location of the production and injection wells, production facilities dimensioning, etc.) is achieved. Hydrocarbon flow simulations in petroleum reservoirs are therefore carried out a software based "flow simulator", according to different schemes. These simulations allow establishing production forecasts for a petroleum reservoir according to the scenario. The scheme allowing the reservoir development to be optimized (volume produced for example) is then selected.

The reservoir is then developed according to this development scheme.

The invention claimed is:

1. A method of underground reservoir development wherein a representation of the underground reservoir is constructed from curves describing an evolution of a saturation of a fluid as a function of at least one property relative to flow of the fluid within the reservoir, the reservoir is represented as a set of cells, and a lithology type is assigned to each cell of the set of cells, comprising:

performing a principal component analysis of a data table constructed from the curves to extract principal factors explaining data in the data table;

representing the curves in a representation space constructed from the principal factors;

classifying the curves represented in the representation space into a set of classes;

defining a curve representative of each class of the classes resulting from the classification;

for each class of the set of classes, associating the class with the lithology type and assigning the representative curve of the class to the cells of the set of cells associated with the lithology type corresponding to the class;

using a flow simulator to define a development scheme for the reservoir from the representation of the reservoir; and developing the reservoir according to the development scheme.

2. A method as claimed in claim 1, comprising:

re-sampling the curves describing the evolution of the saturation of the fluid using a common interval; and constructing the data table with rows and columns from the re-sampled curves with each row corresponding to a value of the property obtained after re-sampling and with each column corresponding to a value of saturation obtained for the re-sampled curves.

3. A method as claimed in claim 2, comprising:

performing the principal component analysis of the data table in which the columns contain variables and the rows contain observations.

4. A method as claimed in claim 3, wherein:

the at least one property relative to flow of the fluid is one of capillary pressure, relative permeability, a Leverett transform of capillary pressure or a Leverett transform of relative permeability.

5. A method as claimed in claim 4, comprising:

constructing the space by determining principal factors to be retained for characterizing a morphology of the curves;

determining a parameter representing the curves in relation to the principal factors which are retained; and defining axes of the representation space from values of the parameter.

6. A method as claimed in claim 5, wherein:

the curves representative of one of the classes are defined by a mean calculated from at least two curves that are closest to a center of gravity of one of the classes.

7. A method as claimed in claim 3, comprising:

constructing the space by determining principal factors to be retained for characterizing a morphology of the curves;

determining a parameter representing the curves in relation to the principal factors which are retained; and defining axes of the representation space from values of the parameter.

8. A method as claimed in claim 7, wherein the parameter represents a correlation between the curves and the principal factors which are retained, or a contribution of the curves to the principal factors which are retained.

9. A method as claimed in claim 3, wherein:

the curves representative of one of the classes are defined by a mean calculated from at least two curves that are closest to a center of gravity of one of the classes.

10. A method as claimed in claim 2, wherein:
the at least one property relative to flow of the fluid is one of capillary pressure, relative permeability, a Leverett transform of capillary pressure or a Leverett transform of relative permeability.

11. A method of constructing the space as claimed in claim 10, comprising:
determining principal factors to be retained for characterizing a morphology of the curves;
determining a parameter representing the curves in relation to the principal factors which are retained; and
defining axes of the representation space from values of the parameter.

12. A method as claimed in claim 11, wherein the parameter represents a correlation between the curves and the principal factors which are retained, or a contribution of the curves to the principal factors which are retained.

13. A method as claimed in claim 12, wherein:
the curves representative of one of the classes are defined by a mean calculated from at least two curves that are closest to a center of gravity of one of the classes.

14. A method as claimed in claim 2, comprising:
constructing the space by determining principal factors to be retained for characterizing a morphology of the curves;
determining a parameter representing the curves in relation to the principal factors which are retained; and
defining axes of the representation space from values of the parameter.

15. A method as claimed in claim 14, wherein the parameter represents a correlation between the curves and the principal factors which are retained, or a contribution of the curves to the principal factors which are retained.

16. A method as claimed in claim 2, wherein:
the curves representative of one of the classes are defined by a mean calculated from at least two curves that are closest to a center of gravity of one of the classes.

17. A method as claimed in claim 2, wherein:
the curves representative of one of the classes are defined by a mean calculated from at least two curves that are closest to a center of gravity of one of the classes.

18. A method as claimed in claim 2, wherein:
the curves representative of one of the classes are defined by a mean calculated from at least two curves that are closest to a center of gravity of one of the classes.

19. A method as claimed in claim 2, wherein:
the curves representative of a class are defined after filtering of the factors used in the classification.

20. A method as claimed in claim 1, wherein:
the at least one property relative to flow of the fluid is one of capillary pressure, relative permeability, a Leverett transform of capillary pressure or a Leverett transform of relative permeability.

21. A method as claimed in claim 20, comprising:
constructing the space by determining principal factors to be retained for characterizing a morphology of the curves;
determining a parameter representing the curves in relation to the principal factors which are retained; and
defining axes of the representation space from values of the parameter.

22. A method as claimed in claim 21, wherein the parameter represents a correlation between the curves and the principal factors which are retained, or a contribution of the curves to the principal factors which are retained.

23. A method as claimed in claim 20, wherein:
the curves representative of one of the classes are defined by a mean calculated from at least two curves that are closest to a center of gravity of one of the classes.

24. A method as claimed in claim 1, comprising:
constructing the space by determining principal factors to be retained for characterizing a morphology of the curves;
determining a parameter representing the curves in relation to the principal factors which are retained; and
defining axes of the representation space from values of the parameter.

25. A method as claimed in claim 24, wherein the parameter represents a correlation between the curves and the principal factors which are retained, or a contribution of the curves to the principal factors which are retained.

26. A method as claimed in claim 24, wherein:
the curves representative of one of the classes are defined by a mean calculated from at least two curves that are closest to a center of gravity of one of the classes.

27. A method as claimed in claim 1, wherein:
classification is performed by an algorithm selected from a "K-means" method, an unsupervised neural network method, an unsupervised Kohonen network method, a hierarchical classification method, a supervised discriminant analysis method or a supervised neural network method.

28. A method as claimed in claim 1, wherein:
the curves representative of one of the classes are defined by a mean calculated from at least two curves that are closest to a center of gravity of one of the classes.

29. A method as claimed in claim 1, wherein
the class is associated with the lithology type by a supervised classification method.

* * * * *